United States Patent [19]

Yap et al.

[11] Patent Number: 5,222,162
[45] Date of Patent: Jun. 22, 1993

[54] MONOLITHIC INTEGRATED OPTICAL TIME DELAY NETWORK FOR ANTENNA BEAM STEERING

[75] Inventors: Daniel Yap; Willie W. Ng, both of Thousand Oaks; Robert R. Hayes, Calabasas, all of Calif.

[73] Assignee: Hughes Aircraft Company, Los Angeles, Calif.

[21] Appl. No.: 800,663

[22] Filed: Nov. 27, 1991

[51] Int. Cl.$^5$ .............................................. G02B 6/12
[52] U.S. Cl. .................................................. 385/14
[58] Field of Search ..................... 385/14, 129, 15, 12

[56] References Cited

U.S. PATENT DOCUMENTS 4,671,605 6/1987 Soref .................................... 385/39
5,109,449 4/1992 Newberg et al. ...................... 385/46

FOREIGN PATENT DOCUMENTS

WO91/14196 9/1991 World Int. Prop. O.

OTHER PUBLICATIONS

"Wideband Fibre-Optic Delay Network for Phased Array Antenna Steering" by NG et al, Electronics Letters, vol. 25 No. 21, Oct. 12, 1989.
"Monolithic Optical Time Shift Network for Phased Arrays", J. Florence, IEEE 1990 International Symposium Digest, Antennas and Propagation, vol. 2, May 1990, N.Y., U.S., pp. 782-785.
"Integrated Optic Time Delay Network for Phased Array Antennas", N. Hartman, 1991 IEEE National Radar Conference, Mar. 1991, N.Y., pp. 79-82.
Radar Handbook 2d Ed., Ed. M. Skolnik, chap. 7, T. Chesterton, "Phased Array Radar Antennas", pp. 7.1-7.82; McGraw-Hill (1990).
W. Ng et al., "Wideband Fibre-Optic Delay Network for Phased Array Antenna Steering", Electronics Letters, vol. 25, No. 21, Oct. 12, 1989, pp. 1456-1457.
W. Ng et al., "Optical Steering of Dual Band Microwave Phased Array Antenna Using Semiconductor Laser Switching" Electronics Letters, vol. 26, No. 12; Jun. 1990, pp. 791-792.
K.-Y. Liou et al., "Monolithic integrated InGaAsP-/InP distributed feedback laser with Y-branching waveguide". . . Appl. Phys. Lett 54(2). Jan. 9, 1989 pp. 114-116.
Tarucha et al., "Monolithic integration of a laser diode and an optical waveguide modulator having a GaAs-/AlGaAS quantum well double heterostructure", Appl. Phys. Lett. 48(1), Jan. 6, 1986, pp. 1-3.
Soole et al., "Butt-coupled metal-semiconductor-metal waveguide photodetector formed by selective area regrowth" Appl. Phys. Lett. 56(16), Apr. 16, 1990, pp. 1518-1520.

(List continued on next page.)

Primary Examiner—Akm E. Ullah
Attorney, Agent, or Firm—V. D. Duraiswamy; W. K. Denson-Low

[57] ABSTRACT

A time delay network for phased array antenna beam steering employs a waveguide network as the delay element in a monolithic integration with other optical and electronic elements on a single substrate. A plurality of optical time delay stages are cascaded to form the delay network, with each stage having a selectable delay time. Each stage preferably has a reference or nominal time delay branch, and at least one other finite time delay branch. The lengths of the delay waveguides vary from stage to stage, permitting a high time delay resolution with a relatively small number of separate waveguides. The desired time delay is selected either by directing the modulated laser light into only one of the waveguide branches in each stage by means of waveguide switches or by splitting the light into all the waveguide branches of a stage and then activating only the detector connected to the desired delay waveguide. A variety of cascading schemes and waveguide layouts can be used to implement the time delay network.

25 Claims, 9 Drawing Sheets

OTHER PUBLICATIONS

Verbeek et al., "Integrated Four-Channel Mach-Zehnder Multi/Demultiplexer Fabricated with Phosphorous Doped $SiO_2$ Waveguides on Si", Journal of Lightwave Technol., vol. 6, No. 6, Jun. 1988, pp. 1011-1015.

Zucker et al., "Compact directional coupler switches using quantum well electrorefraction", Appl. Phys. Lett., 55(22), Nov. 27, 1989, pp. 2280-2282.

Ishida et al.,, "InGaAsP/InP optical switches using carrier induced refractive index change", Appl. Phys. Lett. 60(3), Jan. 19, 1987, pp. 141-142.

Applied Physics Letters, vol. 54, No. 19, May 8, 1989, pp. 1857-1858, "Application of Organometallic Vapor Phase Epitaxy on Patterned Substrates for a New Monolithic Laser Waveguide Butt Coupling Technique", R. Azoulay et al.

MONOLITHIC INTEGRATED OPTICAL TIME DELAY NETWORK FOR ANTENNA BEAM STEERING

GOVERNMENT RIGHTS

This invention was made with Government support under F30602-89-C-0175 awarded by the Department of the Air Force. The Government has certain rights in this invention.

BACKGROUND OF THE INVENTION

1. Field of the Invention

This invention relates to time delay networks for antenna beam steering, and more particularly to time delay networks that operate in the optical regime for steering a phased array antenna.

2. Description of the Related Art

The advent of electronically controlled phase shifters and switches for modern radar applications has focused attention on array antennas. With this type of antenna the aperture excitation can be modulated by controlling the phase of the individual radiating elements to produce beams that are electronically scanned. The principle of operation is that an antenna beam points in a direction normal to its phase front. With phased arrays, the phase front is adjusted to steer the beam by individual control of the phase of excitation for each radiating element. Phased array radar antennas are described in general in *Radar Handbook* 2d Ed., Ed. by M. Skolnik, Chap. 7, "Phased Array Radar Antennas", by T. Cheston and J. Frank, McGraw-Hill, 1990, pp. 7.1-7.82.

The general arrangement of a phased array radar system is illustrated in FIG. 1. Only four antenna radiating elements E1–E4 are shown for simplicity. An RF (radio frequency) generator 2 produces a microwave signal at the desired frequency to be radiated by the antenna. (While radar principles have been applied to signals ranging from a few megahertz to well beyond the optical region, covering a frequency extent on the order of 1,000,000,000:1, many systems operate in the microwave range of about $10^9$–$10^{11}$ Hz.) The RF signal is applied to four separate delay networks DY1–DY4 that are associated with respective radiating elements E1–E4. The various delay networks are programmed by an array computer 4 to delay the received RF signal by the appropriate amount for their respective radiating elements. The delayed signals are then provided to respective transmit/receive (TR) modules TR1–TR4 that are integrated with, or in very close proximity to, the radiating elements E1–E4. The TR modules provide the necessary broadcast power generation, and may be used in lieu of a central power source with a more lengthy distributed feed system to each of the radiating elements. Each TR module may control either one or a group of radiating elements.

The delay elements DY1–DY4 are programmed to produce progressively increasing delays from one end of the array to the other. In the illustration of FIG. 1, element E1 begins to radiate at time $t_0$, element E2 at time $t_0+\Delta t$, E3 at $t_0+2\Delta t$ and E4 at $t_0+3\Delta t$. The result is a transmitted wavefront 6 that is angled to the array, with the beam pointing in a direction 8 normal to the wavefront.

Numerous advanced radar designs for mobile, groundbased, airborne and space-borne applications call for compact, lightweight systems that have extremely wide instantaneous bandwidths, or that can operate at multiple frequency bands, to detect a wide range of object sizes and features. Wideband signals can cause beam "squint" (narrowing) and pattern degradation in phased array antennas that use conventional microwave phase shifter techniques. Squint and degradation are avoided by using beam forming networks with true time delay, which accomplish beam steering by using group delays rather than phase delays.

True time delay steering of phased array antennas has previously been accomplished with the use of coaxial cables connected in an electrical delay network. In such systems, time delay beam steering has generally been used at the sub-array level for coarse beam steering, with phase shifters used at the radiating element level to provide the fine beam steering. Coaxial cables, however, are relatively large and heavy, produce an undesirably high level of dispersion, and are subject to crosstalk. Consequently, because of their physical size, coaxial cables are not very useful for phased array antennas that require extremely long delay times.

A more compact and lightweight system for achieving time-delay beam steering consists of an optical delay network that uses fiber optic rather than coaxial delay lines. Because of the low microwave dispersion and crosstalk of the optical fibers, a delay network for multibands of microwave frequencies can be realized. This system has recently been disclosed in W. Ng et al., "Wide Band Fibre-Optic Delay Network for Phased Array Antenna Steering", *Electronics Letters*, Vol. 25, No. 21, Oct. 12, 1989, pp. 1456-57; and in W. Ng et al., "Optical Steering of Dual Band Microwave Phased Array Antenna Using Semiconductor Laser Switching", *Electronics Letters*, Jun. 7, 1990, Vol. 26, No. 12, pp. 791-92. The disclosed system is designed to steer a dual band (L and X band) phased array antenna, and is essentially "squintless". Eight fiber optic delay lines were connected in parallel, with each line illuminated by a respective laser diode connected to the line by means of a separate optical fiber or "pigtail". The lengths of the delay fibers increased from fiber to fiber in a linear progression, providing eight selectable delay periods for three bits of resolution. A desired time delay is selected by switching on the bias current for the laser diode that is pigtailed to the associated delay fiber. The antenna signal to be delayed is used to modulate the light emitted by the selected laser diode. The time delayed antenna signal is then decoded by a detector that is connected to the other end of the delay fibers.

Although the fiber optic system described above represents a significant improvement over conventional cable or waveguide techniques, it does have several shortcomings. One is an unbalance in the RF signal levels in each delay element that is caused by the variability of the pigtailing process used to connect the lasers to the various fibers. The other is the large number of delay elements needed for high-resolution systems. For n bits of resolution, the parallel-line approach described above requires 2n delay lines, so that an 11-bit system would need 2048 delay lines, an impractically large number. There is thus a need for a time delay network for steering a phased array antenna that avoids the limitations of the prior coaxial cable networks, and yet has better RF transfer uniformity and requires fewer delay lines than the prior fiber optic system.

SUMMARY OF THE INVENTION

The present invention seeks to provide an optical time delay network for phased array antennas that is lighter and more compact than previous systems, does not suffer from beam squint or signal dispersion, achieves high resolution with only a limited number of delay lines, provides more uniform device characteristics and optical coupling, and offers improved ruggedness and greater ease of manufacturing.

In accordance with the invention, time delays are implemented with an optical delay network. The various elements of the system are monolithically integrated on a semiconductor substrate. The system includes a plurality of cascaded optical time delay stages that each have a plurality of different selectable delay times. Each stage corresponds to one or more bits of resolution, with a maximum overall delay time for the network substantially equal to the sum of the maximum stage delays. A switch mechanism selects delay times for each of the stages to produce a desired overall delay. One or more lasers directs an electrically modulated optical beam into the optical waveguides of the delay stages, with one or more photodetectors detecting the delayed optical output and transducing it to an output electrical signal. The time delay waveguides, switches, lasers, modulating mechanism and detectors are all monolithically integrated on the semiconductor substrate. The electronics may also be integrated on the same substrate.

In general, each of the time delay stages is subdivided into a plurality of unequal length optical waveguide branches which include one or more waveguide delay segments that produce the specified delay times for that stage, and a reference segment that produces a reference delay time which is substantially less than the specified delay. One branch of each stage is selected for inclusion in the overall delay network and provides the delay time for that stage. The sum of the separate stage delay times is the desired overall time delay for the network. For a base-p time delay system, the specified waveguide delay branches for the different stages vary in length in proportion to $p^n$, where n is the order of the stage within the overall network. Base-2 (2 branch) or base-4 (4 branch) networks are preferred, but in principle any number of branches can be used per stage.

In one class of embodiments, a single input laser illuminates the first cascaded delay stage. The laser light is then directed through the selected delay branches in the cascade of delay stages by means of optical waveguide switches in response to electrical switch signals. A single output photodetector transduces the delayed optical signal into the corresponding electrical signal.

In a second class of embodiments, each stage is provided with an associated laser that illuminates the waveguides for that stage in response to the detected optical signal propagated through the previous stage (or, for the first stage, in response to the input signal). Each separate delay branch within a given stage is provided with an associated output photodetector, with the switch mechanism selecting among the different branches by actuating the detector for only one branch of each stage.

There are a variety of possible implementations for each class of embodiments of the monolithic time delay network. For many applications, the length of the longest waveguide delay branch is larger than the diameter of the semiconductor wafer. In those cases, various waveguide layouts that incorporate spirals, loops or zig-zags can be used to achieve the long waveguide lengths, with short bypass branches providing the reference delays. For the first class of embodiments, it is preferable to use ridge or buried type waveguides that are butt coupled to the laser and detector. The core regions of the delay branch waveguides and of the optical waveguide switches can be aligned to be collinear with the active optically emitting or absorbing regions of the laser or detector, respectively, by various material growth techniques. For the second class of embodiments it may be more convenient to use rib type waveguides, although waveguides of the other types may also be used. The optical detector can be formed by growing the optically absorbing layer above the core layer of the waveguide. Multiple detectors can be spaced along the length of a single waveguide to tap the modulated optical signal after it has been propagated through the specified delay length. This configuration is preferred for networks with base-4 or higher base stages. For base-2 stages, another possible implementation is to use the optical emission from the front and back ends of the laser cavity separately for the delayed and reference branches.

These and other features and advantages of the invention will be apparent to those skilled in the art from the following detailed description, taken together with the accompanying drawings, in which:

DETAILED DESCRIPTION OF THE INVENTION

The present invention obtains improved performance together with a more compact and lightweight structure for a phased array antenna beam steerer by monolithically integrating all of the operative elements, including lasers and modulators, the delay line waveguides, switches, photodetectors and electronics, on a single substrate, and by providing the time delay network for each antenna element or commonly actuated group of antenna elements as a single cascaded multistage network. The term "cascade" in this context refers to a serial arrangment of delay stages, with each stage processing a beam signal after the preceeding stages and before the following stages. The use of a cascade architecture reduces the aggregate delay line length needed to achieve a specified overall delay time and resolution. Steering of the antenna beam is achieved by varying the time delays of the microwave signals that address the antenna elements.

Figure 1:
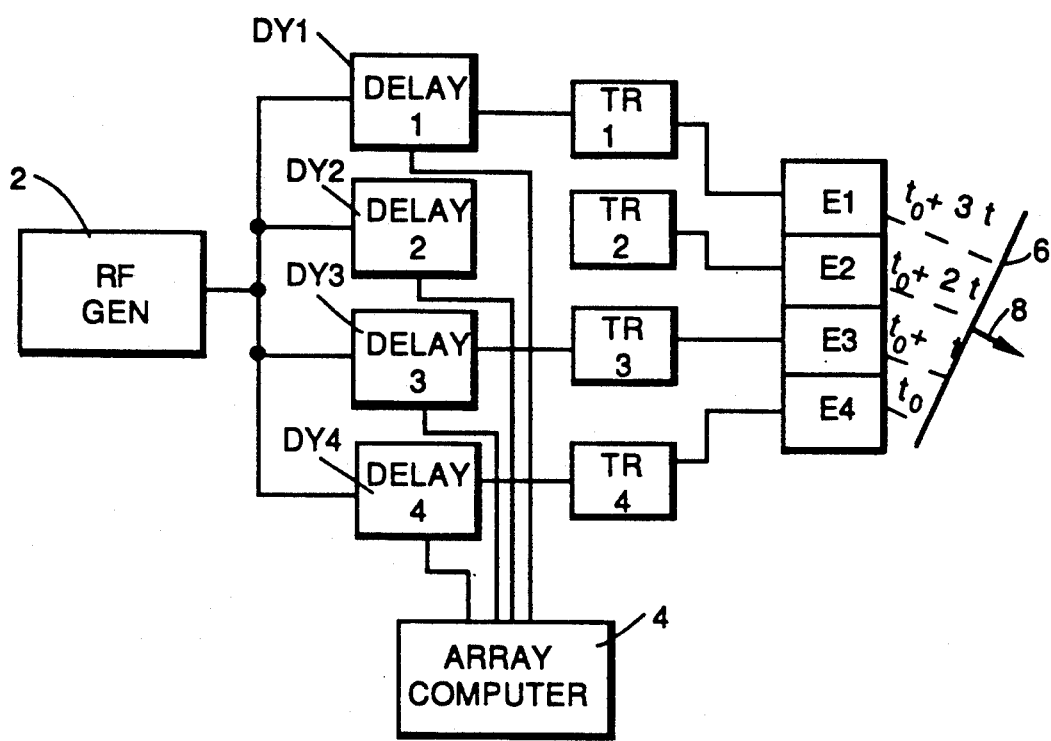
FIG. 1 is a block diagram, described above, of a phased array antenna system.

Only a single delay network is described herein, but it should be understood that similar delay networks would be provided for each commonly controlled group of antenna elements. Whereas FIG. 1 illustrates four delay networks, in practice many more would normally be employed. In use, the various delay networks could be programmed so that the phased array antenna elements steer an output beam in a conventional manner. Several different semiconductor substrate materials may be used as a base for the monolithic integration, such as silicon, GaAs or InP.

Two general approaches to the construction of a delay network will be described herein. In both approaches the delay network is composed of successive delay stages that are connected in cascade, so that the aggregate delay time for the overall network is the sum of the delay times for each individual stage. In one approach, only a single input laser and output detector are employed at the beginning and end, respectively, of the overall delay line. In the other approach, each stage has individual input laser and output detectors. These approaches are described in the following embodiments.

EMBODIMENT I

Figure 2:
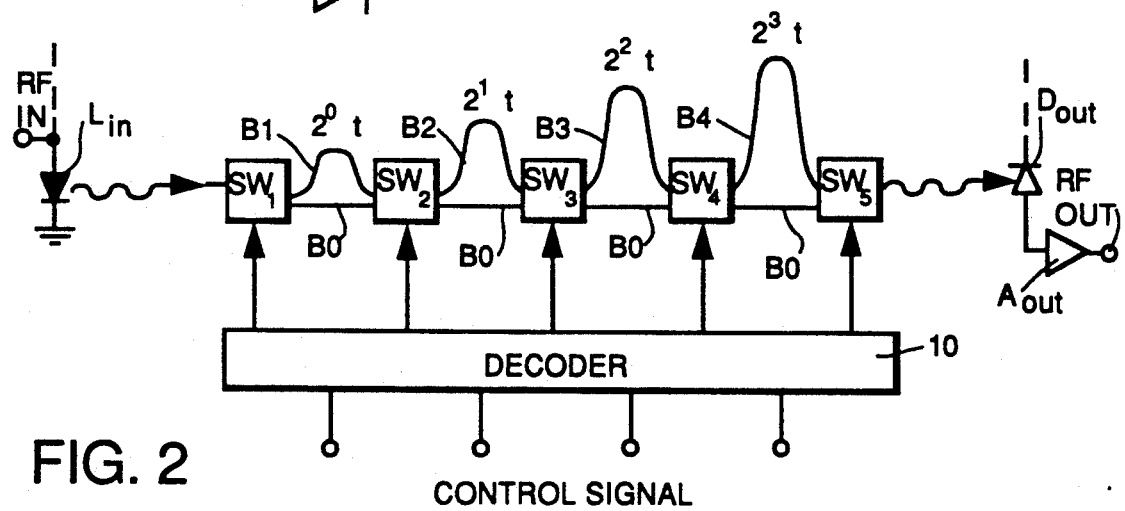
FIG. 2 is a schematic diagram of a delay network embodiment in accordance with the invention, in which only a single input laser and output detector are employed at the ends of a cascade of multiple delay stages.

A block diagram illustrating the first type of delay network is illustrated in FIG. 2, with a single input laser Lin and a single output detector Dout. Each of a plurality of cascaded delay stages has two parallel branches (a larger number of branches could also be employed). One branch B0 is short, producing a negligible reference delay. The other branches B1-B4 (for four stages) are connected in parallel with their respective reference branches B0 and have lengths that increase in binary order. Thus, the relative lengths of branches B1, B2, B3 and B4 are 1, 2, 4 and 8. These longer branches produce the specified stage delay for their respective stages. Optical waveguide switches SW1-SW4 at the input to each stage direct the optical signal from the previous stage (or from the input diode laser Lin for the first stage) to one or the other of the two waveguide branches for that stage, as determined by switch control signals that operate the switches through a decoder 10. A final switch SW5 directs the optical signal from the selected branch of the final stage to the output detector Dout, which produces an electrical signal that is amplified by an output amplifier Aout to produce an RF output signal for an antenna element.

The overall delay line is established by switching the individual stages so that the delay branches for selected stages (any or all of B1, B2, B3, B4) are included in the overall delay, with the reference branches B0 for the remaining stages switched in. To achieve n bits of resolution, this arrangement requires only n stages and $2 \times n$ delay lines as compared to the $2^n$ delay lines required for a parallel scheme. Furthermore, the physical length of the longest delay segment is only half the length of the longest segment required for a parallel-configured network. The aggregate length of all the delay segments is also greatly reduced. This is of particular importance for the present monolithic integrated implementation, since the finite substrate size upon which the delay network is formed limits both the maximum delay length and the number of delay branches that can be laid out.

The approach of FIG. 2 has several advantages over other techniques. The first is that it only requires one RF-to-optical conversion (the modulated laser in FIG. 2), and one optical-to-RF conversion (the detector and subsequent amplifier of FIG. 2). This can represent a considerable savings in cost, in required drive power, and in space when compared with approaches that require multiple conversions. Furthermore, the optical switches are virtually transparent to the RF modulation on the optical carrier, which means that the switches have an essentially infinite RF bandwidth, perfectly flat transmissivity, and no phase distortion. These are highly desirable properties for phased array radar systems. In addition, electro-optic waveguide switches require virtually no drive power, have zero heat dissipation, and can be extremely compact. The only shortcoming of this approach is that the faster waveguide switches that would be required for this type of application presently have an optical leakage that limits achievable RF interchannel isolation to a maximum of about 50 or 60 dB. This value may improve, however, as optical waveguide switch technology matures.

Figure 3:
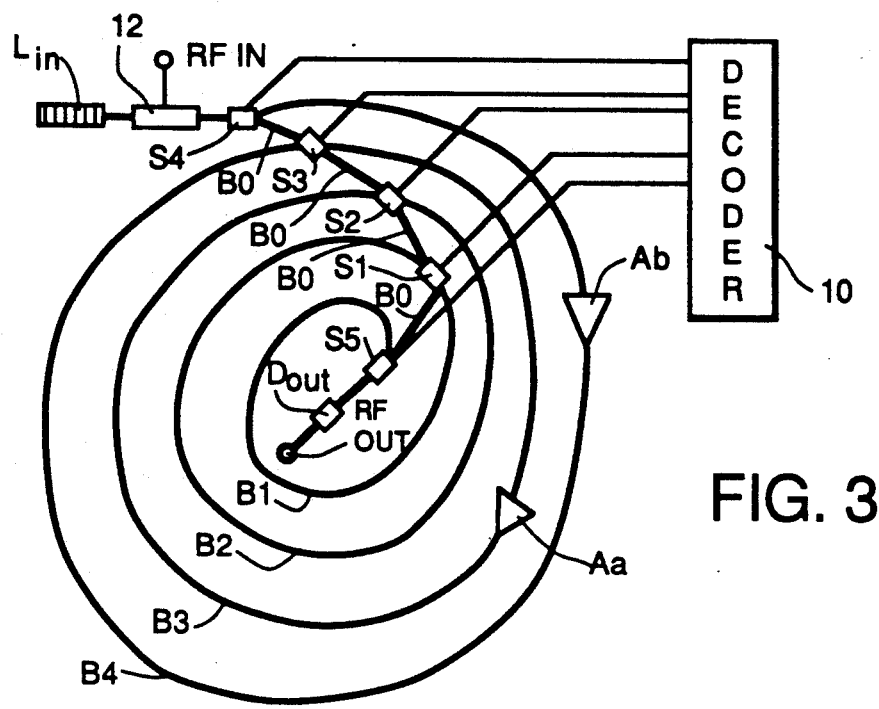
FIG. 3 is a diagram of one possible geometric layout for implementing the delay network of FIG. 2.

A waveguide layout that can be used for the delay network of FIG. 2, employing waveguide spirals to achieve the desired delay lengths, is shown in FIG. 3. The longer delay branches form the outer loops of the spiral, with the reference branches B0 bypassing the spiral loops. Optical waveguide amplifiers Aa and Ab may be included in the longer delay paths to compensate for the loss incurred in those waveguides, and a separate laser modulator 12 may also be included. In this implementation, the order of the delay stages has been reversed to obtain a more compact layout of the waveguides.

EMBODIMENT II

Figure 4:
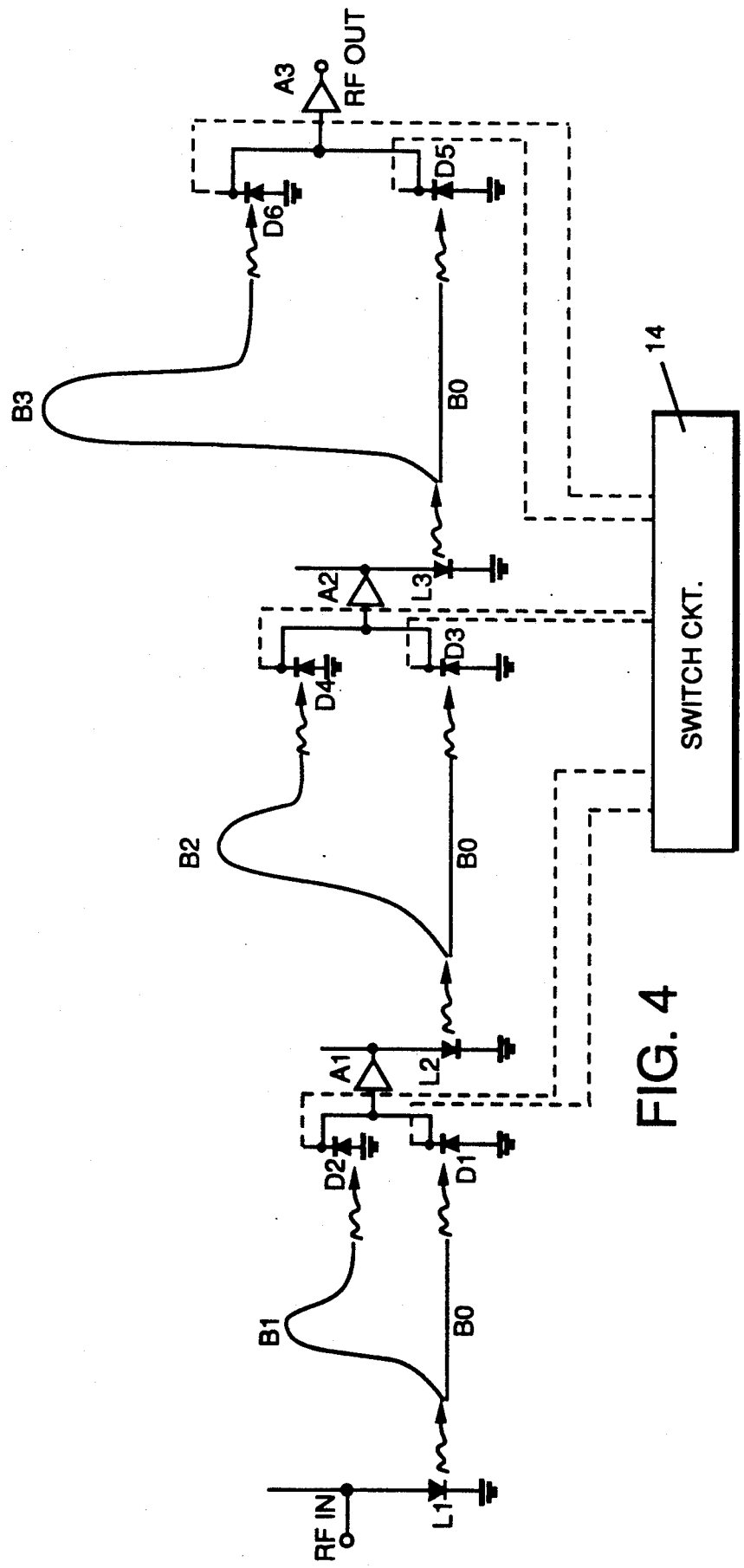
FIG. 4 is a schematic diagram of a second delay network embodiment that uses separate lasers and detectors for each cascaded delay stage.

The second type of delay network is illustrated in FIG. 4. The delay line is composed of successive delay stages connected in cascade; three stages are illustrated. Each stage contains a waveguide which branches into a reference arm B0 and a specified delay arm B1, B2 or B3. The delay branches of each stage have different lengths, and therefore provide different delays. For a given stage, either the reference branch or the specified delay branch is selected by an electronic switching circuit 14 so that the aggregate time delay for the entire line equals the sum of the selected branch delays for each stage. Each stage is illuminated by a respective input laser L1, L2 or L3. Photodetectors D1, D2, D3, D4, D5 or D6 are connected to the end of each delay segment, followed by electronic amplifiers A1, A2 or A3 which amplify the detected outputs of their respective stages to provide actuating signals for the laser of the successive stage (or to actuate one or more antenna elements in the case of the last stage).

The operation of this delay network can be understood by examining the first delay stage. The input laser L1 for that stage has its optical output directed into a waveguide that is divided into two branches B0 and B1 (or alternately into two separate waveguides corresponding to B0 and B1, which arrangement is the functional equivalent of a two-branch waveguide). Branch B0 is short and produces a small reference delay, while branch B1 is substantially longer and produces the specified stage delay. Branches B0 and B1 are oriented to illuminate optical detectors D1 and D2, respectively, illustrated as light sensitive diodes. Only one of these diodes is actuated by the switching circuit 14, with the other diode held off. The actuated diode produces an electrical output that is amplified in electronic amplifier A1, resulting in an RF output signal that is applied to the laser L2 for the next stage. Each delay stage thus receives and outputs electrical signals, but uses an optical network to produce a controlled delay. The lengths of the reference delay paths for each stage are preferably equal, while the lengths of the specified delay paths preferably progress from stage to stage in binary order, with each stage providing one bit of resolution.

Figure 5:
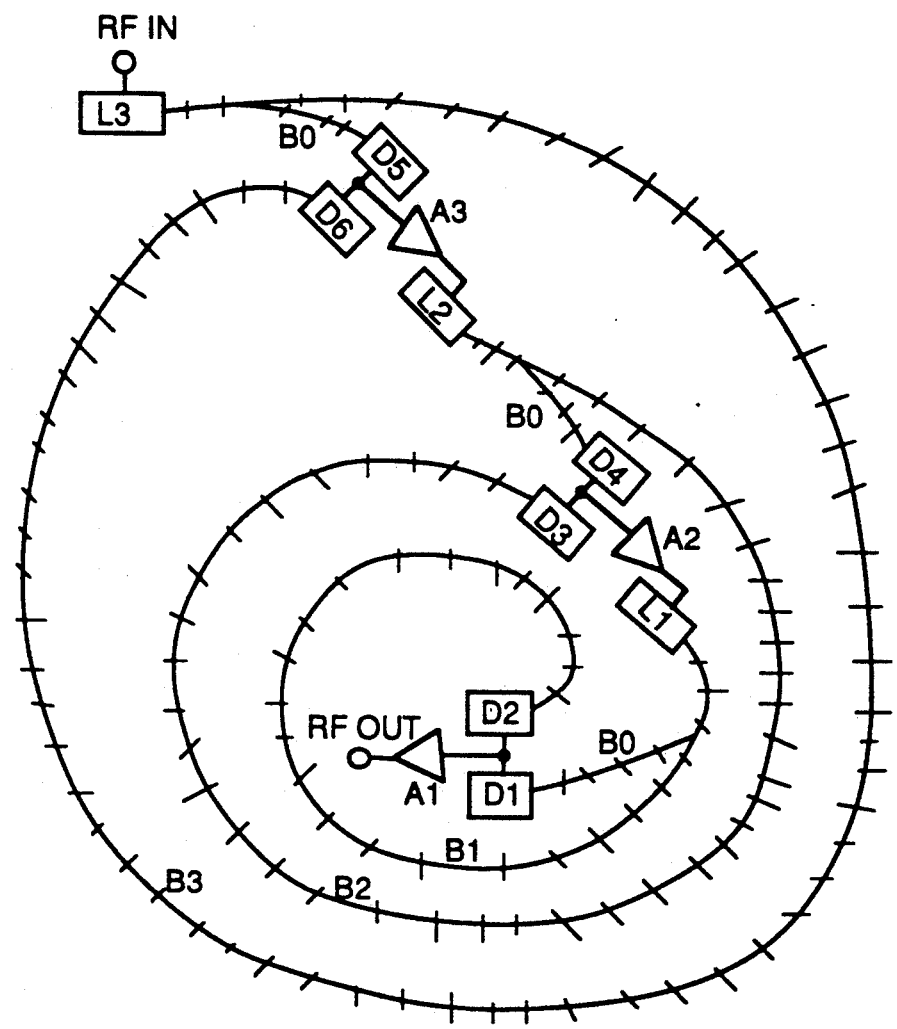
FIG. 5 is a diagram of one possible geometric layout for implementing the delay network of FIG. 4.

A waveguide layout similar to the one shown in FIG. 3 could be used for the delay network of this embodiment. The layout is illustrated in FIG. 5. As with FIG. 3, the order of the stages is reversed from that illustrated in the corresponding schematic digram (FIG. 4). The layout again has long waveguide loops B1, B2, B3 and bypass segments B0. Waveguide branches split the light into both the delay loops and the bypass segments. An RF modulated laser L3 illuminates the first branch. Each branch is followed by a respective pair of detectors D1, D2, etc., electronic amplifier A1, etc. and laser L2, etc. as illustrated in the insert. The final branch (for the final stage) is terminated by a detector pair D1, D2 and amplifier A1.

EMBODIMENT III

Figure 6:
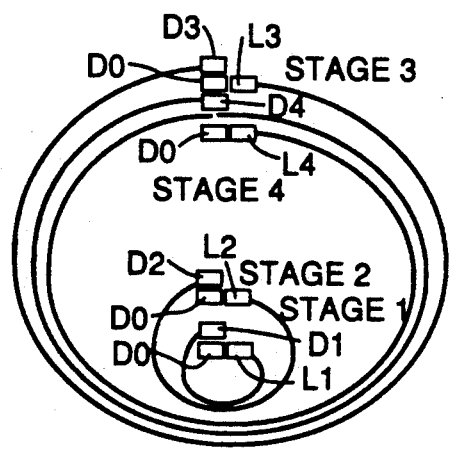
FIG. 6 is a diagram of a second possible geometric layout for implementing the delay network of FIG. 4.

Another waveguide layout for a network that employs two branches for each stage, with a photodetector in each branch, is illustrated in FIG. 6. Instead of using a waveguide branch, light is taken from both ends of the laser to effect the reference and active paths. Only the lasers, detectors and waveguide delay lines are shown. The layout for four stages (identified respectively as STAGE 1, 2, 3 and 4) are illustrated. The various stages include respective input lasers L1–L4 that illuminate a short reference waveguide to a reference detector D0, and longer delay waveguides to respective delay detectors D1–D4. The stages are arranged in generally concentric loops, with the fourth stage inside the third stage but having two loops for added compactness.

EMBODIMENT IV

Figure 7:
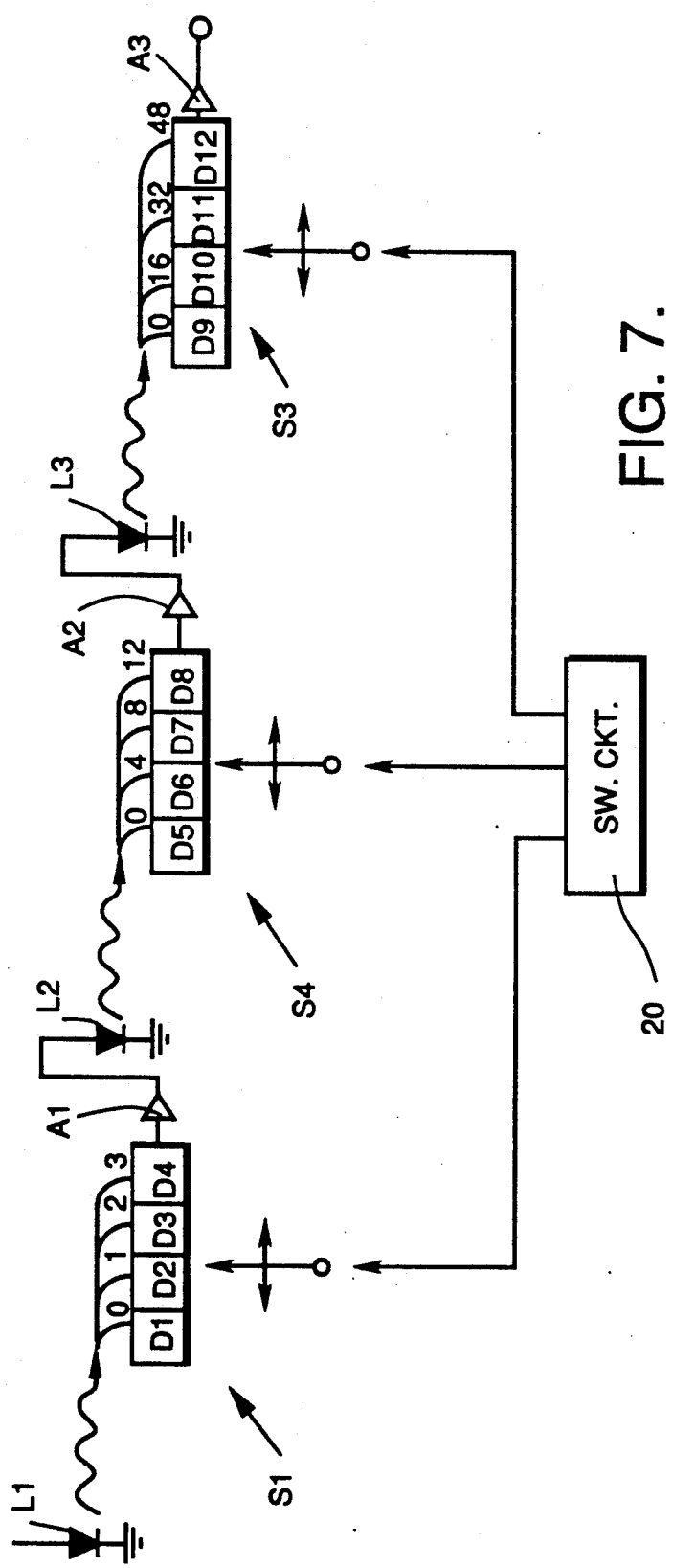
FIG. 7 is a schematic diagram showing another delay network embodiment with delay stages that contain a reference delay branch and multiple selectable delay branches of differing lengths, with a base-4 (4 branch) configuration illustrated.

The cascade architecture used by the invention is not limited to a base of 2. Higher base schemes, such as base-4, can also be used. A base-4 system is illustrated in FIG. 7. It requires only half as many stages as a base-2 scheme, although the lengths of the individual delay segments are increased. In FIG. 7 the RF modulated light in each stage is split into four waveguide delay paths; the relative lengths of each path or branch are indicated in the figure, with "0" referring to a reference branch of negligible length. Specifically, the first stage S1 has branches with relative lengths 0, 1, 2 and 3, the second stage S2 has branches with relative lengths 0, 4, 8 and 12, and the third stage S3 has branches with relative lengths 0, 16, 32 and 48. Thus, three of the branches for each stage have lengths that are respectively one, two and three times the unit delay of that stage, while the remaining branch provides a "no delay" reference.

Each of the waveguide delay branches has a respective photodetector D1–D12 that detects an optical signal transmitted through that branch. A desired delay time is obtained by applying a bias signal to actuate one of the four detectors for each stage, by means of a switch select mechanism 20 such as the array computer. The detected microwave signals from each stage are amplified by respective RF amplifier circuits A1, A2, A3, which can also be integrated on the same substrate and are used to provide an input to the laser for the next stage (or as an output for the last stage).

Figure 8:
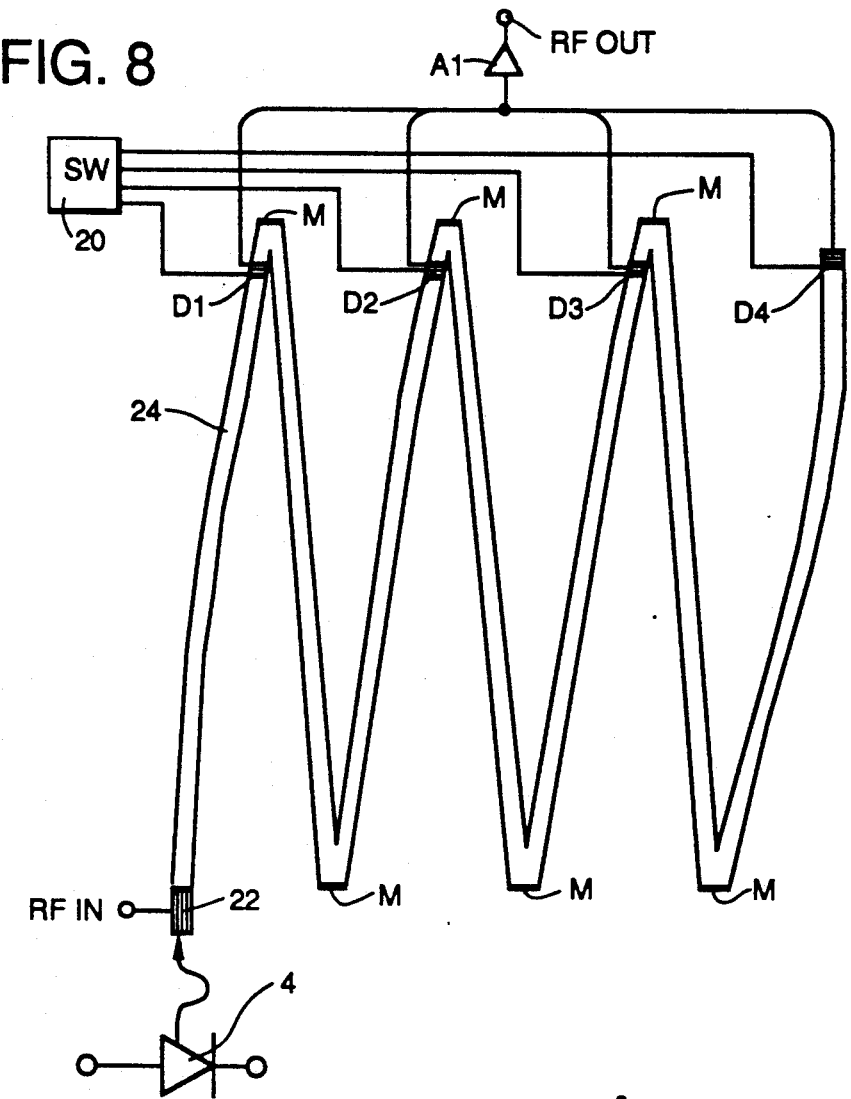
FIG. 8 is a diagram of one possible geometric layout for a stage of the delay network shown in FIG. 7.

An exemplary waveguide layout that is suitable for the delay network of FIG. 7 and employs a zig-zag waveguide is shown in FIG. 8. One stage of a base-4 cascaded network with detector switching is illustrated. The delay line consists of a single main waveguide 24 with reflective mirrors M provided at each "zig" and "zag" of the waveguide to keep the optical signal within the waveguide. An RF modulator 22 can be provided at the input to the waveguide to modulate the optical signal from laser L1 with the RF input. Alternately, the laser itself can be electrically modulated. The optical detectors D1–D4 tap the optical signal off selected points along the zig-zagging waveguide. The detectors are built into the waveguide. This can be realized by growing an optically absorbing detector layer directly above the epitaxial structure for the waveguide, and then selectively removing that absorbing layer from the regions of the wafer that do not comprise the detectors. The lengths of the detectors D1, D2 and D3 are so designed that each detector absorbs only a portion of the light that reaches it, with the remaining light being guided on to the next detector. The length of the last detector D4 is designed to obtain the maximal absorption permitted by the device response speed. The detectors can have different lengths, with the detectors that are more distant from the waveguide input having longer lengths and thus greater responsivity to compensate for the lower optical signal levels reaching those detectors. Thus, the RF signal levels at all of the detector outputs can be made the same. An alternative to having the detectors directly on the main waveguide is having short waveguide branches that tap off the main waveguide and feed the detectors. Only one of the detectors D1–D4 is actuated by switch selector 20, with the electrical signal from the selected detector processed through amplifier A1 to provide an RF output signal. Greater delay times are achieved by actuating a detector that is located further along the waveguide.

The responsivities of the individual detectors can be adjusted to compensate for waveguide losses which cause the optical signals at the more distant detectors to be lower.

The approach of FIG. 7 can be generalized for different numbers of steps and different numbers of delay branches within each stage. The length of each branch within a given stage relative to the other branches within that stage preferably varies with m, where m is the order of the branch within the stage. The length of the longest branch within each stage preferably varies with $p^n$, where n is the order of the stage within the network and p is the number of branches in each stage.

The choice of a particular cascading scheme depends upon the specific application. A higher base cascading scheme requires fewer opto-electronic components. However, the length of the longest delay segment becomes larger for a higher base scheme. The maximum delay length $L_d$ needed for steering an antenna of aperture L to an angle $\theta$ is equal to $L\sin\theta/N$, where N is the effective waveguide refractive index. In a base-2 cascading scheme, the longest delay segment is $L_d/2$. In contrast, the longest delay segment of a base-4 cascading scheme is $3L_d/4$. Taking into account the small size (about 5-8 cm diameter) of type III-V semiconductor wafers that are commonly available, lowerbase cascading schemes would be preferable for wide aperture antennas, whereas higher-base schemes would be more attractive for antennas that require finer resolution.

As has been illustrated, a variety of possible implementations for each design of a time-delay network are available. For many applications the length of the longest waveguide delay segment is much larger than the diameter of the semiconductor wafer. Thus, various waveguide layouts that incorporate spirals, loops or zig-zags can be used to achieve the necessary long delay segments. A spiral configuration similar to FIG. 3 can also be used for a higher base cascading scheme such as base-4, while a zig-zag configuration similar to FIG. 8 may be used for schemes other than base-4, such as base-2.

By monolithically integrating all of the operative elements of an optically-based time delay network for each radiating section of a phased array radar on a single substrate, including the lasers, modulator, waveguide delay paths, detectors, switching elements and electronics, broadband and true time delay steering of phased array antennas can be accomplished with a lightweight, compact mechanism that avoids prior problems of beam squint, signal dispersion and crosstalk. Other advantages of the present approach include uniformity of device characteristics, uniformity of optical coupling within the network, improved ruggedness and greater ease of manufacturing, since critical alignments are performed in the wafer processing.

IMPLEMENTATION OF EMBODIMENTS

It should be possible to realize the monolithic optical time delay network described in the preceding embodiments by using devices, materials and processing technologies that are either currently available to one skilled in the art, or that should become available in the near future. These are discussed in the following paragraphs in relation to their use in the various embodiments described earlier.

Because of their small size, high efficiency and high output powers, III-V semiconductor lasers are preferred for the delay network light sources. These lasers typically emit in one of two wavelength ranges: 0.78-1.02 microns for GaInAs/AlGaAs/GaAs lasers, and 1.3-1.55 microns for InGaAsP/InP lasers. Direct modulation of these lasers has been achieved at microwave frequencies extending beyond X band.

Figure 9:
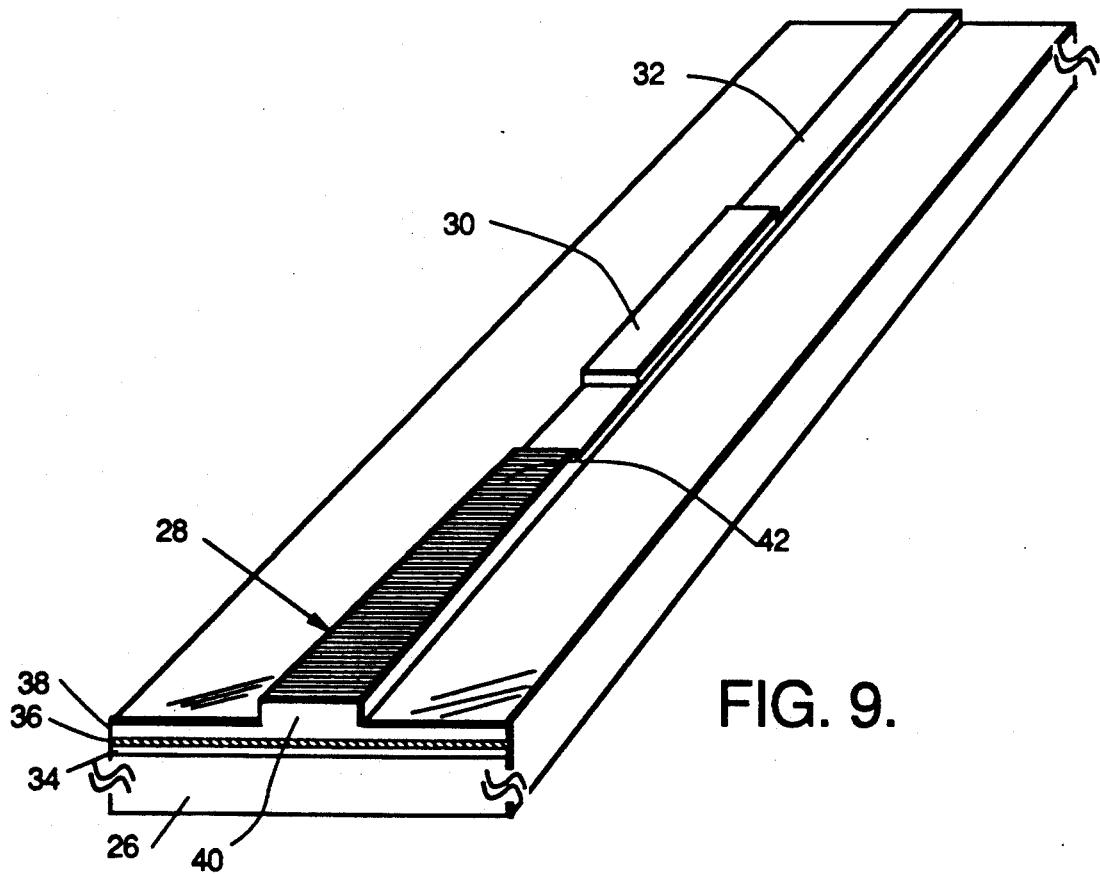
FIG. 9 is a perspective view illustrating the monolithic integration of a laser, modulator and waveguide delay line.

The lasers employed in the delay network must be capable of monolithic integration on a chip. Ridge waveguide and buried heterostructure lasers are two suitable types of structures for this purpose. FIG. 9 illustrates a portion of a semiconductor chip substrate 26 that incorporates a distributed feedback ridge waveguide laser 28 coupled to a ridge waveguide electroabsorption modulator 30 and then a passive rib waveguide delay line 32. The laser 28 incorporates a cladding layer 34 over the substrate, an active layer 36 over the lower cladding layer 34, and an upper cladding layer 38 that forms an upper guiding ridge 40. An etched grating 42 is formed in the ridge to establish a distributed mirror for lasing operation. Alternately, mirrors could be etched at opposite ends of the ridge 40. More complicated implementations that include buried heterostructure lasers and buried waveguides could also be used.

The RF microwave signal is applied to the modulator 30 at the laser output or, alternately, directly to the laser without the use of a separate modulator. Direct modulation of the laser has been sufficient for operation at the L through X bands, at frequencies less than about 15-20 GHz. However, operation of the lasers at higher frequencies that approach their high frequency limit, or relaxation oscillation frequency, results in higher noise. Separate waveguide modulators used together with DC-operated lasers are suitable for frequencies both greater and less than 20 GHz. In addition to the electroabsorption modulators, high frequency modulators have been demonstrated with directional coupler and Mach-Zehnder interferometer configurations, both having travelling-wave electrodes. The structure of the modulator 30 is similar to that of the laser 28, although the active modulating material is different from the active laser material. The active modulating material is generally transparent to the laser light, depending upon the modulation signal.

Figure 10:
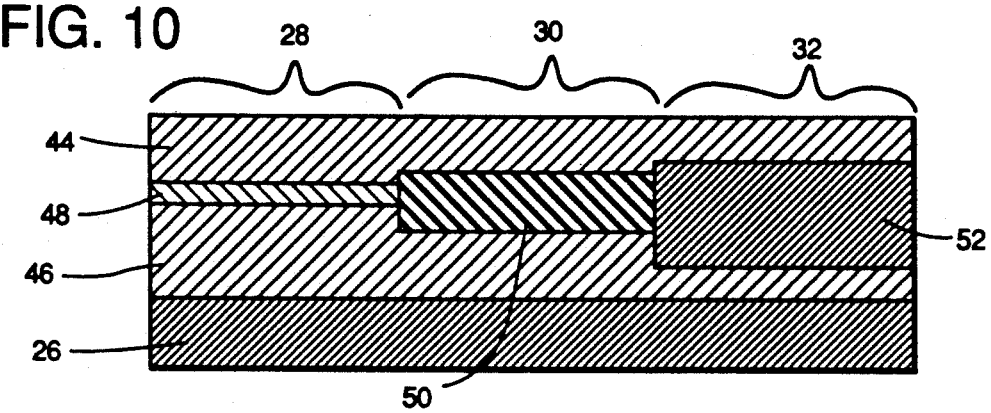
FIG. 10 is a sectional view showing the butt coupled alignment of a monolithically integrated laser/modulator/waveguide.

A cross-section of one monolithic integrated implementation of the laser/modulator/waveguide section is shown in FIG. 10, fabricated on a GaAs substrate 26. The cladding layers 44 and 46 for the modulator and waveguide can be the same, such as $Ga_{.8}Al_{.2}As$, while the cladding layers for the laser are selected to produce a larger energy step with the active layer; $Ga_{.3}Al_{.7}As$ is an example of a suitable laser cladding. A thin active layer 48 for the laser 28 is formed from an InGaAs quantum well with GaAs barrier layers, all located between the two cladding layers. The modulator active layer 50 is formed from a somewhat greater thickness of InAs/GaAs superlattice and the waveguide core 52 is a still thicker layer of GaAs. With III-V semiconductor waveguides, the energy bandgap of the guiding medium must be larger than the energy of the operating wavelength. Thus, GaAs and GaAlAs are transparent to the 0.9-1.0 $\mu$m wavelength emitted by an InGaAs quantum well.

The composition of the waveguide epitaxial layers is designed to create a refractive index differential that provides optical confinement in the vertical transverse direction. GaAs-based waveguides will usually contain a heterostructure composed of the higher refractive index GaAs guiding layer with the lower refractive index AlGaAs cladding layer on one or both sides. For InP-based waveguides, the InP layers have the lower refractive index, with the higher refractive index layers composed of GaInAsP or GaAlInAs. The strength of optical confinement in the vertical direction depends upon the index differences and the thicknesses of the layers.

Figure 11A:
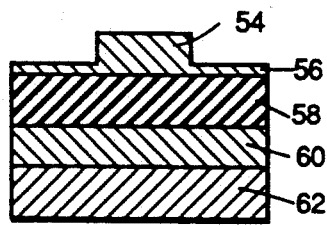
FIGS. 11a, 11b and 11c are sectional views of a ridge waveguide, a rib waveguide and a buried waveguide, respectively, that can be employed in the invention.
Figure 11B:
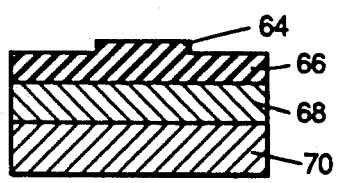
Figure 11C:
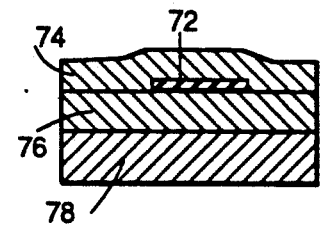

Examples of several different channel waveguide structures that can be fabricated in GaAs and InP-base materials are illustrated in FIGS. 11a, 11b and 11c. A ridge waveguide is shown in FIG. 11a, with an upstanding ridge 54 etched in the higher index cladding layer 56. The core guiding layer 58 is below the upper cladding layer 56, with a lower cladding layer 60 below the core layer. The assembly is carried by the substrate 62. A rib waveguide, illustrated in FIG. 11b, has a rib 64 etched in the higher index guiding layer 66, which is on top of the structure. A single cladding layer 68 is formed below the guiding layer on the substrate 70. For both of these structures, optical confinement in the lateral transverse direction, to form the channel waveguide, results from the protruding ridge or rib. This forms a lateral effective refractive index differential in the guiding region. Another waveguide structure, a buried waveguide illustrated in FIG. 11c, has a guiding region 72 that is completely surrounded by upper and lower cladding layers 74 and 76, respectively, with the lower cladding layer formed on the substrate 78. Optical confinement in the lateral direction results from the lower refractive index of the cladding material. The depth and width of the etched ridge or rib, together with the dimensions of the guiding layer or region, determine the number of modes that are guided in the waveguide. Ribs or ridges with smooth sidewalls yield low scattering loss.

Optical waveguides fabricated in III-V semiconductors, such as GaAs and InP, offer the opportunity for true monolithic integration of optical, opto-electronic and electronic circuits, including lasers, modulators, waveguides, detectors, switches, power splitters, taps and high speed electronic components. However, the achievement of low optical loss in the longer delay lines requires a very high quality material growth capability. An alternate technology involves waveguides of such materials as silica or polyimide formed on a semiconductor substrate. Such waveguides have generally been demonstrated on silicon substrates, but III-V semiconductor substrates can also be used.

The actual lengths of the specified delay branches for each delay stage will depend upon the material used for the waveguide, the size of the antenna and the optical wavelength. Longer delay periods are necessary for longer wavelengths and larger antennas. The physical length of a waveguide is its optical length divided by its refractive index n. Hence, a free-space delay length of 24.8 cm for 28° of steering translates into a physical length of 16.5 cm for a silica or polymer waveguide with n about 1.5, and 7.09 cm for type III-V semiconductor waveguides with n about 3.5. Because of their higher refractive index, the III-V semiconductor waveguides offer a physical length advantage for the longer delay times called for by larger steering angles or antenna apertures.

Figure 12:
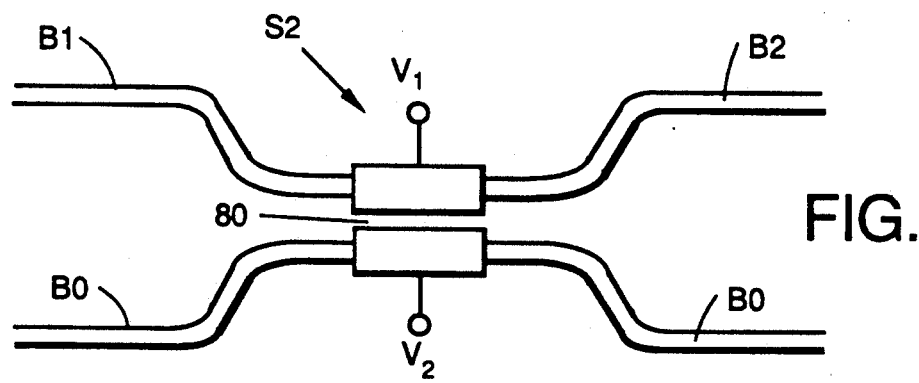
FIG. 12 is a simplified drawing of a directional coupler type switch between two optical waveguides.

A directional coupler type optical waveguide switch, suitable for use in the delay network of FIG. 2, is illustrated in FIG. 12. The two waveguide branches B0 and B1 for the first stage are kept far enough apart from each other, except in the vicinity of optical switch S2, to prevent cross-coupling; the same is true for the waveguide branches B0 and B2 of the following stage. At switch S2 the two waveguides B0 and B1/B2 are brought close enough to each other to produce evanescent coupling, by which power is transferred from one waveguide to the other through the region between the two guides. By means of evanescent coupling, an optical beam propagating along one waveguide will oscillate back and forth between the two waveguides as it progresses through the switch area. The spatial period of this oscillation depends upon the propagation constants of the light in the two guides. An optical signal in one of the waveguide segments to the left of the switch can be directed to either waveguide segment B0 or B2 in the second stage, to the right of the switch, by an appropriate adjustment of the refractive index of the interguide region 80 or the refractive indices of the waveguides themselves. This is accomplished by applying a suitable voltage differential V2-V1 across the interguide region or the waveguides; one of the voltages is provided from the decoder 10 (FIG. 2) and the other is a reference voltage. To accomplish the switching, the voltage differential is set to one of two alternative values. Other optical switching arrangements can also be used, such as interference between multiple guided modes at a waveguide intersection or the use of total internal reflection at a boundary created in an intersection. Typically, ridge or buried waveguides, rather than a rib configuration, are used with optical switches.

Figure 13:
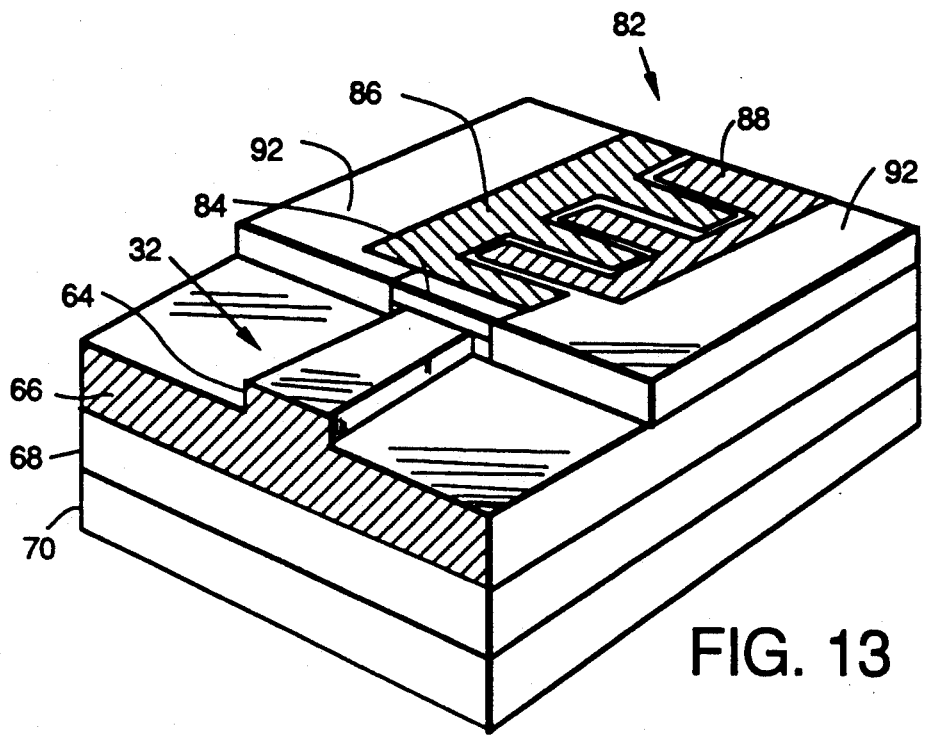
FIGS. 13 and 14 are perspective views of two different photodetector embodiments that can be employed with the invention, with FIG. 13 used for detector switching and FIG. 14 used for optical waveguide switching.

An important feature of the present invention is the monolithic integration of the photodetectors with the optical waveguides that serve as the delay lines. The integration of these two components offers considerable flexibility in the geometric layout of the delay lines, especially for longer delay times or higher bits of resolution. One method of coupling a waveguide to a photodetector is illustrated in FIG. 13, which shows waveguide 32 (FIG. 9) as the rib waveguide device of FIG. 11b. The opposite end of the waveguide from its input laser is coupled to a metal-semiconductor-metal (MSM) detector 82. The detector includes an optically absorbing active layer 84 that is positioned immediately above and in contact with the waveguide rib 64. Light from the waveguide travels up to the detector's absorbing layer because the absorbing layer's refractive index is greater than that of the waveguide core. Electrical charge carriers generated in the detector's active layer are sensed by interdigitated metal electrodes 86 and 88, which deliver a electrical signal corresponding to the optical signal in the waveguide. Electrodes 86, 88 extend over the absorbing layer 84 from lateral planarizing dielectric layers 92. An advantage of MSM detectors is that they can be placed on top of the actual time delay waveguides. Also, the lengths of the MSM detectors can be adjusted to compensate for the increased optical loss that occurs for the longer overall delay paths. The various detectors can, therefore, all have comparable RF output signal levels. Furthermore, when no bias voltage is applied to activate the detector the absorbed optical signal is not sensed. This type of detector is ideally suited for the embodiments based on detector switching.

Figure 14:
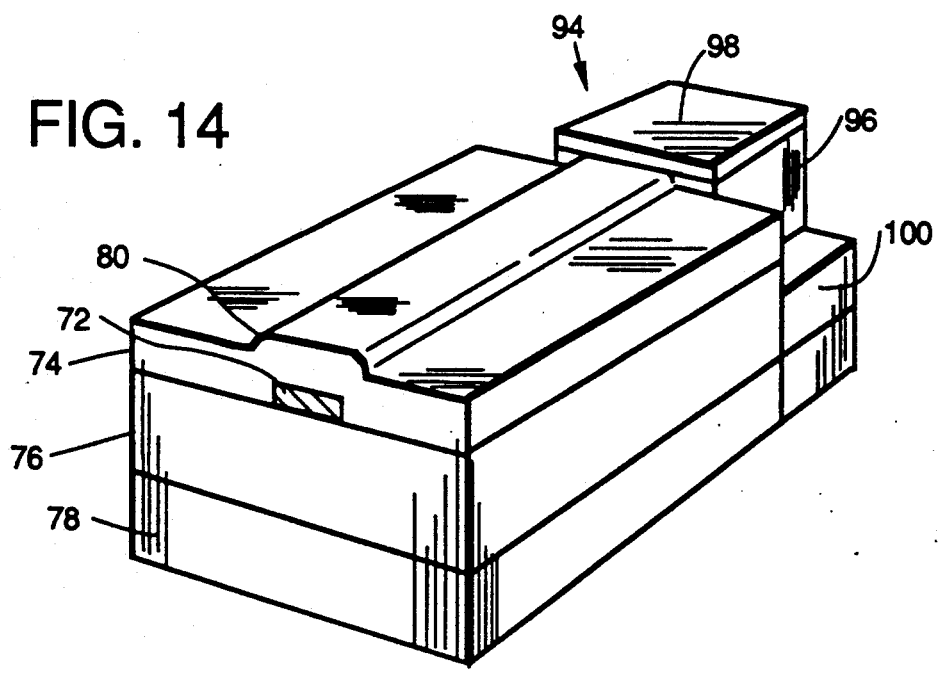

Another type of detector that can be used in conjunction with waveguides whose guiding layer is buried underneath a cladding material, such as the ridge waveguide of FIG. 11a or the buried waveguide of FIG. 11c, is illustrated in FIG. 14 (in conjunction with the buried waveguide of FIG. 11c). The detector 94 consists of a p-intrinsic-n (PIN) device that is butt-coupled to the buried waveguide. PIN detector 94 includes an undoped active (absorbing) layer 96 in alignment with the buried waveguide guiding layer 72, an upper p+ contact layer 98, and a lower n+ contact layer 100. This type of detector is better suited for networks that incorporate optical waveguide switches.

Figure 15:
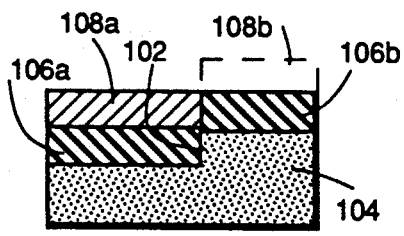
FIG. 15 is a sectional view illustrating one fabrication technique for a monolithically integrated laser and waveguide.

Various fabrication techniques for the monolithic integrated structure are possible. A preferred method, illustrated in FIG. 15, is to etch a step 102 into the chip substrate 104. Waveguides 106a and 106b are then fabricated over the substrate on both sides of the step (the different material layers forming the waveguide are not shown, for simplicity), followed by the fabrication of lasers 108a and 108b over the waveguide layers on both sides of the step. The step dimension is selected so that the waveguide section 106a adjacent to the step forms a base for the laser section 108a adjacent to the step, optically aligning laser section 108a with the waveguide section 106b on the portion of the substrate above the step. The upper laser section 108b above waveguide section 106b is then removed, leaving laser 108a butt-coupled to waveguide 106b. For integration of additional elements such as modulators and detectors, multiple steps could be etched into the substrate. This technique has been reported in R. Azoulay, et al., "Application of Organometallic Vapor Phase Epitaxy on Patterned Substrates for a New Monolithic Laser Waveguide Butt Coupling Technique", Applied Physics Letters, Vol. 54, No. 19, May 8, 1989, pp. 1857–1858.

Figure 16A:
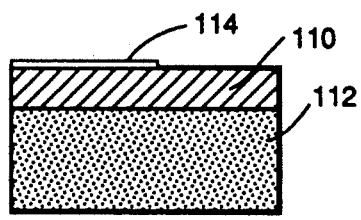
FIGS. 16a, 16b and 16c are sectional views illustrating successive stages in another laser/waveguide fabrication technique.
Figure 16B:
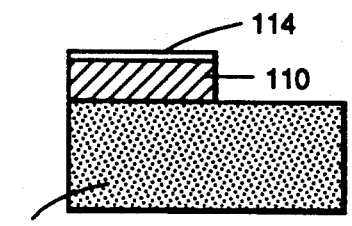
Figure 16C:
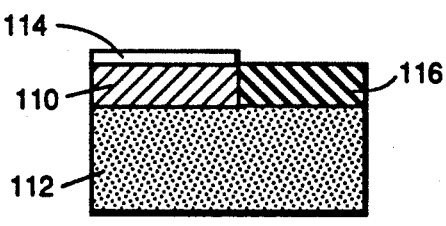

An alternate fabrication technique is illustrated in FIGS. 16a, 16b and 16c. A continuous laser layer 110 is first grown over the entire substrate 112. The portions of the laser layer desired for the final lasers are then screened by a mask layer 114, which is deposited by standard photolithographic techniques. The laser layer 110 is next etched away, except in the areas protected by the mask 114, as illustrated in FIG. 16b. A waveguide is then grown over the entire substrate and removed except in the desired waveguide areas, leaving a waveguide region 116 coupled to the laser 110 as illustrated in FIG. 16c. The other elements, such as modulators and detectors, are grown in a similar fashion. A mask is placed over a desired area for each element after it is initially grown, with the unmasked areas removed. This technique has been reported in J.B.D. Soole, et al., "Butt-Coupled InGaAs Metal-Semiconductor-Metal Waveguide Photodetector Formed by Selective Area Regrowth", Applied Physics Letters, Vol. 56, No. 16, Apr. 16, 1990, pp. 1518–1520.

Figure 17:
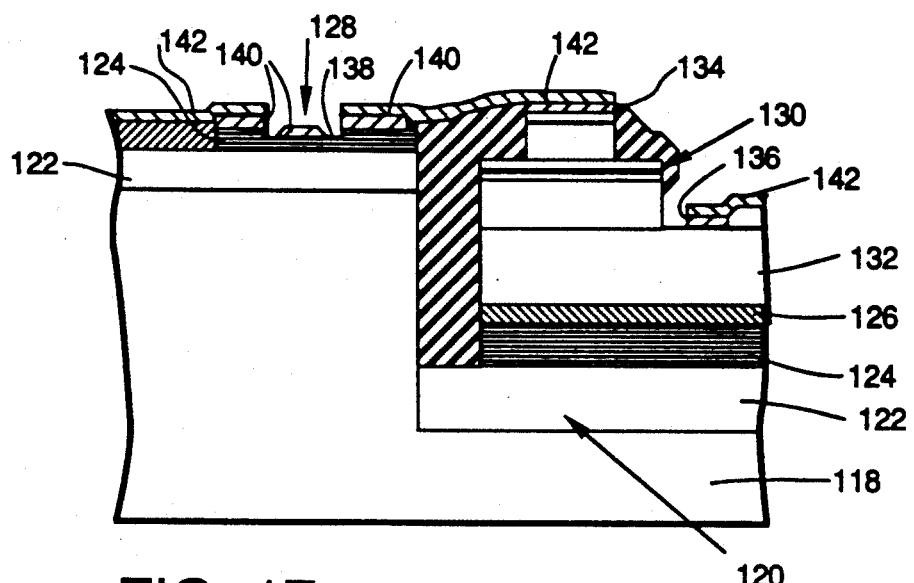
FIG. 17 is a sectional view illustrating the monolithic integration of control electronics with a ridge-waveguide laser employed in the invention.

The electronic circuitry, such as the laser driver, receiver and switch circuits, can be fabricated in a monolithic integration with the optical structure described above. The integration of a field effect transistor (FET) from one of these circuits with a ridge waveguide laser is illustrated in FIG. 17. A GaAs substrate 118 is provided with a recess 120 at the intended laser location, and surmounted by an undoped GaAs buffer layer 122. GaAs FET layers 124 are deposited over the buffer layer, capped by an AlGaAs etch stop layer 126 over the area intended for the optical structure. The site of FET 128 is defined, and a laser structure 130 is grown over the entire substrate and then removed except in the laser recess 120. The laser structure incudes an n contact layer 132. After removing all of the laser layers external to the laser recess, the laser ridge and steps are etched, followed by the formation of p- and n- ohmic contacts 134 and 136 to the laser. The FET is then completed by forming a gate recess 138 in the upper FET layer 124, and establishing source, drain and gate contacts 140. Finally, a metallization layer 142 is deposited to define the circuit interconnects.

The described monolithic integrated time delay network provides the numerous advantages mentioned above for phased array antenna beam steering. While this is its primary application, the invention is not limited to beam steering and may be useful in other areas. Although several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A monolithically integrated time delay network, comprising:
   a semiconductor substrate,
   an optical waveguide time delay network comprising a plurality of cascaded optical time delay stages on said substrate,
   switch means for adjusting the time delay of said optical waveguide time delay network,
   an input optical means for directing an input optical beam into said network,
   means for modulating said optical beam in accordance with a modulating signal, and
   a photodetector for detecting the delayed optical output from said waveguide delay network and transducing said output to an output electrical signal,
   said optical waveguide time delay network, switch means, optical means, modulating means and photodetector being monolithically integrated on said substrate.

2. The time delay network of claim 1, for steering a phased array radar antenna, wherein said switch means selects delay times to produce a desired overall delay corresponding to a desired antenna phase delay, said modulating means modulates said optical beam with a radar signal, and said photodetector transduces said delayed optical output from said waveguide time delay network to an output electrical signal at a radar frequency suitable for said antenna.

3. The time delay network of claim 1, each of said stages having a respective plurality of different selectable delay times, said network providing an overall time delay for said network which is substantially equal to the sum of said selected stage delay times.

4. The time delay network of claim 1, each of said time delay stages including a delay branch having a specified delay time for that stage, and a reference branch having a reference delay time that is substantially less than said specified delay time, said switch means switching between said delay and reference branches for each stage.

5. The time delay network of claim 4, the delay and reference branches for each stage comprising respective waveguide segments of different lengths.

6. The time delay network of claim 4, said switch means comprising means for directing the light from one or more waveguides at the input into one or more separate waveguides at the output in response to electrical switch signals.

7. The time delay network of claim 6, wherein the waveguide delay segments for said time delay stages vary in length substantially in proportion to $2^n$, where n is the order of the stage.

8. A monolithically integrated time delay network, comprising:
   a semiconductor substrate,
   an optical waveguide time delay network,
   switch means for adjusting the time delay of said network,
   an input optical means for directing an input optical beam into said network,
   means for modulating said optical beam in accordance with a modulating signal, and
   a photodetector for detecting the delayed optical output from said waveguide delay network and transducing it to an output electrical signal,
   said optical waveguide time delay network, switch means, optical means, modulating means and photodetector being monolithically integrated on said substrate, and
   said optical waveguide time delay network comprising a plurality of individually switchable multi-branch delay stages, and further comprising said switch means which direct said input optical beam through specified branches of said delay stages, said delayed optical output having the accumulated delay from propagation through said specified delay stage branches.

9. A monolithic integrated time delay network, comprising:
   a semiconductor substrate,
   a plurality of cascaded optical time delay stages on said substrate, each of said stages having a respective plurality of different selectable delay times, said network providing an overall time delay for said network which is substantially equal to the sum of said selected stage delay times,
   switch means for selecting delay times for each of said time delay stages to produce a desired overall delay,
   optical means for directing an input optical beam into said cascaded optical time delay stages,
   means for modulating said optical beam with a modulating signal, and
   photodetector means for detecting the delayed optical output from said cascaded time delay stages and transducing it to an output electrical signal,
   said optical time delay stages, switch means, optical means, modulating means and photodetector means all being monolithically integrated on said semiconductor substrate.

10. The time delay network of claim 9, for steering a phased array radar antenna, wherein said switch means selects delay times to produce a desired overall delay corresponding to a desired antenna phase delay, said modulating means modulates said optical beam with a radar signal, and said photodetector means transduces said delayed optical output from said waveguide time delay network to an output electrical signal at a radar frequency suitable for said antenna.

11. The time delay network of claim 9, wherein each of said time delay stages is divided into a respective plurality of individual time delay waveguide branches of unequal lengths, and said switch means comprises means for selecting among the branches of each stage.

12. The time delay network of claim 11, wherein said optical means comprises a laser which directs a laser beam into each of the waveguide branches for the first time delay stage, each subsequent time delay stage has an associated laser that directs a laser beam into each of the waveguide branches of that stage, the means for modulating said laser beam for each respective subsequent time delay stage being actuated in response to the optical signal propagated through the previous time delay stage.

13. The time delay network of claim 12, wherein each time delay branch has an associated photodetector for detecting an optical signal transmitted through said branch, and said switch means select among said branches by actuating a selected detector for each branch.

14. The time delay network of claim 13, wherein the length of each branch within a time delay stage varies relative to the other branches of the same stage with m, where m is the order of the branch within the stage, and the length of the longest branch within each stage varies with $p^n$, where n is the order of the stage within the network and p is the number of branches in each stage.

15. The time delay network of claim 9, each of said cascaded optical time delay stages comprising a laser with modulation means and multiple waveguide delay segments having different lengths, each of said delay segments having an associated photodetector, said switch means actuating one selected photodetector in each of said stages, said modulation means of each stage except the first being activated in response to the transduced electrical signal from said selected photodetector of its immediately preceding stage, said transduced electrical signal having the appropriate time delay for the respective stage, said time delay occurring from propagation of the optical beam through the waveguide delay segment associated with said selected photodetector, output electrical signal from final delay stage having the accumulated delay from propagation through the selected waveguide delay segments of the entire cascade of delay stages.

16. A monolithically integrated time delay network comprising:
   a semiconductor substrate;
   a plurality of coupled cascaded optical waveguide delay lines,
   a plurality of lasers for supplying optical beams into said waveguide delay lines,
   modulation means for modulating said laser beams in accordance with modulating electrical signals,
   photodetectors for detecting optical outputs from said waveguide delay lines and transducing them to output electrical signals, and
   switch means for directing the light propagating through said optical waveguide delay lines,
   said waveguide delay lines, lasers, modulation means, photodetectors and switch means being monolithically integrated on said substrate.

17. A monolithically integrated time delay network comprising:
   a semiconductor substrate;
   a plurality of coupled optical waveguide delay lines,
   a plurality of lasers for supplying optical beams into said waveguide delay lines,
   modulation means for modulating said laser beams in accordance with modulating electrical signals,
   photodetectors for detecting optical outputs from said waveguide delay lines and transducing them to output electrical signals, and
   switch means for directing the light propagating through said optical waveguide delay lines, said waveguide delay lines, lasers, modulation means, photodetectors and switch means being monolithically integrated on said substrate, wherein said waveguide delay lines comprise longer delay segments and shorter bypass branches, said delay segments having lengths appropriated for producing specified time delays, and said bypass branches having a much shorter length for producing a reference delay.

18. The time delay network of claim 17, wherein said delay segments comprise spirals, loops or zig-zags for containment of the waveguide delay lines on said substrate.

19. The time delay network of claim 17, wherein said lasers have optical cavities with two ends, optical emission from the two ends of said lasers being used to separately supply the delayed and reference signal paths.

20. The time delay network of claim 17, wherein said waveguide delay lines contain taps located along the lengths of said waveguide delay lines, said taps removing light that has propagated through differing lengths of said waveguide delay lines.

21. The time delay network of claim 20, said waveguide taps comprising branches of said delay lines, wherein one arm of each branch is a continuation of its respective waveguide delay line and the other arm of the branch is coupled to a photodetector.

22. The time delay network of claim 20, said waveguide taps comprising photodetectors built into their respective waveguide delay lines, said photodetectors containing optically absorbing regions located above their respective waveguide delay lines.

23. The time delay network of claim 20, wherein said waveguide delay lines comprise spirals, loops or zig-zags for containment of the waveguide delay lines on said substrate.

24. The time delay network of claim 17, wherein said photodetectors have sensitivities that are adjusted to compensate for unequal light levels at their inputs.

25. The time delay network of claim 24, said photodetectors containing optically absorbing regions located above their respective waveguide delay lines, wherein the lengths of said optically absorbing regions are adjusted to produce said adjusted sensitivities.

* * * * *